(12) United States Patent
Gredy et al.

(10) Patent No.: US 9,447,856 B2
(45) Date of Patent: Sep. 20, 2016

(54) PLANET FOR A PLANETARY ROLLING-CONTACT SCREW

(71) Applicant: Schaeffler Technologies GmbH & Co. KG, Herzogenaurach (DE)

(72) Inventors: Horst Gredy, Oberreichenbach (DE); Bernd Eichenhuller, Erlangen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 112 days.

(21) Appl. No.: 14/364,814

(22) PCT Filed: Nov. 6, 2012

(86) PCT No.: PCT/EP2012/071889
§ 371 (c)(1),
(2) Date: Jun. 12, 2014

(87) PCT Pub. No.: WO2013/087299
PCT Pub. Date: Jun. 20, 2013

(65) Prior Publication Data
US 2014/0378271 A1 Dec. 25, 2014

(30) Foreign Application Priority Data
Dec. 16, 2011 (DE) .................. 10 2011 088 905

(51) Int. Cl.
*F16H 57/08* (2006.01)
*F16H 25/22* (2006.01)
*B21H 5/02* (2006.01)

(52) U.S. Cl.
CPC .......... *F16H 25/2252* (2013.01); *B21H 5/027* (2013.01); *F16H 57/08* (2013.01); *Y10T 29/49471* (2015.01)

(58) Field of Classification Search
CPC .................................................. F16H 25/2252
See application file for complete search history.

(56) References Cited

FOREIGN PATENT DOCUMENTS

| DE | 102008008013 | 10/2009 | |
|---|---|---|---|
| DE | 102010011819 | 9/2011 | |
| DE | 102010011820 | 9/2011 | |
| JP | 61269948 | 11/1986 | |
| SU | 1283465 A1 * | 1/1987 | ......... F16H 25/2252 |

\* cited by examiner

*Primary Examiner* — Terence Boes
(74) *Attorney, Agent, or Firm* — Volpe and Koenig, P.C.

(57) ABSTRACT

A planet (11) for a planetary rolling contact gear, along whose planetary axis a middle section (12) having a larger diameter and, axially on both sides of the middle section (12), end sections (13) having a smaller diameter are formed, wherein a first engagement profile (14) is formed on the lateral surface of the planet (11) in the middle section (12) and a second engagement profile (15) is formed on the lateral surface of the planet (11) in the end sections (13), wherein the first engagement profile (14) has a plurality of first teeth (16) that are arranged in an annular manner around the planetary axis, wherein first grooves (17) arranged in an annular manner about the planet axis are formed between successive first teeth (16), wherein the two first edge teeth (23) located at the ends of the middle section (12) are formed within and at a distance from a tooth contour (18) of the first teeth (16) of the middle section (12).

18 Claims, 4 Drawing Sheets

PLANET FOR A PLANETARY ROLLING-CONTACT SCREW

BACKGROUND

Planetary rolling contact gears are being used more and more in drive systems and components. A relative rotation between the spindle nut and the threaded spindle is converted into an axial displacement between the spindle nut and the threaded spindle. Between the threaded spindle and the spindle nut there are planets that are arranged distributed over the periphery and roll on the threaded spindle and on the spindle nut with the relative rotation.

From DE 102010011819, a planetary rolling contact gear is known. The planet has a middle section with a greater diameter along its planet axis and end sections with a smaller diameter on both sides of the middle section in the axial direction, wherein a first engagement profile is formed on the lateral surface of the planet in the middle section and a second engagement profile is formed in each of the end sections. The planets are in rolling engagement with their first engagement profile with a helical thread of the threaded spindle wound about the spindle axis. The planets are in rolling engagement with their second engagement profile with a nut-side engagement profile of the spindle nut.

The first engagement profile of the planet has a plurality of annular first teeth arranged about the planet axis, wherein first grooves arranged in the shape of a ring about the planet axis are formed between successive first teeth for an engagement of the thread of the threaded spindle, wherein a tooth contour is allocated to each of the teeth of the middle section. These first grooves are also designated as advance feed grooves, because the rolling engagement with the threaded spindle allows the relative advance feed between the threaded spindle and spindle nut. The second engagement profile has a plurality of second teeth arranged in a ring about the planet axis, wherein second grooves arranged in a ring about the planet axis are formed between successive second teeth. These second grooves are also designated as guide grooves, because the planets with these second grooves are in rolling engagement with the nut-side engagement profile and are guided on a circular path about the spindle axis into the spindle nut.

While the planetary rolling contact gear is in operation, the planets can be loaded with axial forces that are transferred between the spindle nut and the threaded spindle via the engagement profiles. If the tips of teeth in the engagement profiles break off, a problem-free operation of the planetary rolling contact gear is disrupted.

SUMMARY

The object of the invention is to disclose a planet that is suitable for a planetary rolling contact gear and avoids the disadvantage mentioned above.

According to the invention, this objective is met in that the two first edge teeth set at the ends of the middle section are formed within and at a distance to the tooth contour of the first teeth of the middle section. The first teeth have a useful section that can be used for a rolling engagement with the threaded spindle. This useful section reaches from the tooth tip in the direction toward the tooth root, but not to a base of the groove in which the thread of the threaded spindle engages. The useful section extends across the overlapping area of the overlapping first teeth of the planet and the thread of the threaded spindle. The first edge tooth is arranged within this useful section of the first teeth within and at a distance to the specified tooth contour. The first edge tooth is underformed with respect to the tooth contour of the first teeth. This underforming can extend from the tooth tip to the tooth root or to the groove base of the adjacent groove, so that the first edge tooth is formed completely within and at a distance to the associated tooth contour.

The invention has recognized that a targeted reduction of the edge tooth at least in the useful section of the first teeth makes a considerable contribution to a problem-free operation of the planetary rolling contact gear. The first edge tooth is consequently not loaded or not fully loaded in the rolling contact of the planet with the threaded spindle. The risk of failure of the edge tooth is significantly reduced.

Sections of the tooth flanks of first edge teeth according to the invention that already do not come into rolling contact with the threaded spindle due to the arrangement of the planet and threaded spindle relative to each other and that are thus outside of the useful section can be tangent to or pass through the tooth contour allocated to the first teeth. Preferably, however, the first edge teeth can be arranged within the tooth contour allocated to the first teeth and at a distance to this contour, that is, from the tooth tip to the tooth root.

The rolling contact path can describe a point on the tooth flank, seen in the longitudinal section through the planet, so that the rolling contact path forms a closed, ring-shaped line. The rolling contact path can be formed as a line along the tooth flank, seen in the longitudinal section through the planet, so that the rolling contact path describes a closed, ring-shaped area. The rolling contact between the rolling partners on the rolling contact path can be point-shaped or linear.

The targeted underforming is important especially for the shaping production method. If planets according to the invention are rolled in a rolling process, the rolling profile of the tool is prepared accordingly in the area of the first edge tooth. The planet blank to be shaped in the rolling process can have a contour that is formed in the area of the first edge tooth to be shaped such that material of the planet blank is reshaped in the free material flow and forms at least a contour of the first edge tooth. In this case, the rolling tooth is not completely filled out in the area of the first edge tooth, but instead there is still space for a free flow of material of the planet blank.

Especially for a shaping method for producing the planet, a suitable shaping tool and basic planet blanks can be tailored and adjusted to each other so that the first edge teeth are formed within and at a distance to the tooth contour of the first teeth. A production method according to the invention and a device for performing the method are described below.

A plurality of teeth means that at least two teeth are formed, with a groove arranged in-between. The teeth can bound the groove with their facing tooth flanks. A tooth contour in the sense of the invention surrounds the tooth; it describes the contour that the ordinarily produced first teeth have within the allowed tolerances.

In a known way, the tooth flanks of the first teeth have first rolling contact paths arranged about the planet axis in the coaxial direction for the rolling engagement with a threaded spindle. The two intermeshing rolling partners contact each other in rolling contact on the rolling contact path that extends in a ring shape about the planet axis.

In a construction according to the invention, the two first edge teeth of the middle section have a smaller tooth thickness relative to the other first teeth of the middle section. This smaller tooth thickness lies on a radius of the rolling contact path, whose middle point lies on the planet axis. In this way it is ensured that the first edge teeth are not loaded or not fully loaded. Under loading, the planets arranged according to the invention in the planetary rolling contact gear can be exposed to loading at their first edge teeth through the threaded spindle due to elastic deformation of the components in rolling engagement; but the contour of the first edge teeth according to the invention makes sure that the first edge teeth are loaded with a smaller load than the other first teeth.

The tooth tips of the first edge teeth of the middle section are preferably arranged radially within the tooth tips of the other first teeth of the middle section. This measure contributes to a reduced loading of the edge teeth. A tooth height in the middle section from the base of the groove up to the tooth tip of the first edge tooth equals advantageously approximately 50% to approximately 90% of the tooth height of the other first teeth.

The second engagement profile of the end section can have a plurality of second teeth arranged in a ring shape about the planet axis, wherein second grooves arranged in a ring shape about the planet axis are formed between successive second teeth. The ring-shaped grooves and teeth arranged coaxially about the planet axis can be parallel to a plane that is arranged transverse to the planet axis.

On its end facing the middle section, the end section can have a second edge tooth that is not completely formed just like the first edge tooth. A tooth tip of the second edge tooth can be arranged radially within the tooth tips of the other second teeth of the end section. These planets according to the invention can prevent undesirably high loading of the second edge teeth in rolling contact with the spindle nut.

First teeth arranged adjacent to each other can bound the first groove with their facing tooth flanks, wherein successive second teeth bound the second groove with their facing tooth flanks.

An intermediate section that can extend in the axial direction from the tooth tip of the first edge tooth to the tooth tip of an adjacent second edge tooth of the end section can be formed between the middle section and the two end sections. The second teeth of the end section—with respect to the planet axis—have a smaller diameter than the first teeth. The intermediate section can advantageously taper along the planet axis in the direction toward the end section. In this way, it is ensured that, in the area of the intermediate section, only a contact of the threaded spindle with the tooth flank of the edge tooth facing the end section is possible. Contact in the other intermediate section, however, is precluded.

On the free end of both end sections, a peg can be formed that is arranged coaxial to the planet axis and whose, in particular, cylindrical lateral surface can be arranged radially within tooth tips of the second teeth of the end section. This peg known in planets is used to mount the planet in a cage. The pegs engage in bearing openings of the cage and are mounted so that they can rotate.

If planets according to the invention are produced using non-cutting methods in a shaping process, for example, in a rolling process, tooth tips of the edge teeth can be formed with an incomplete shape; in the crown area of such edge teeth, the tooth tips can have a jagged surface formed due to a free material flow. The tooth flanks facing away from each other on the first and second edge teeth can be formed in a problem-free way under rolling contact with the rolling tool and can form a rolling contact path.

The first edge tooth can be formed on its side facing the end section with an only partially formed tooth flank that can come into rolling contact with the threaded spindle in the installed state in the planetary rolling contact gear under loading and elastic deformation of the involved components, wherein, however, due to the reduced first edge teeth according to the invention, the main load is absorbed by the other first teeth of the middle section and the first edge tooth is loaded only with greatly reduced loads.

The second edge tooth of the end section can have no tooth flank or only a rudimentarily formed tooth flank on its side facing the middle section. The method according to the invention described below for producing planets according to the invention allows an economical production of planets that guarantee a reliable connection between the spindle nut and the threaded spindle during operation.

Initially a planet blank is prepared that has, along its planet axis, a thicker cylindrical middle section and thinner cylindrical end sections set on both axial ends of the middle section, wherein transition sections tapering from the middle section to the end sections are formed between the middle section and the end sections. These transition sections can have a tapered shape. The first and the second engagement profiles are rolled into the lateral surface of the planet blank, wherein a lateral surface of the transition section of the planet blank is shaped in the free material flow under a shaping force to form an intermediate section that is set approximately between tooth tips of the two first and second edge teeth of the middle section arranged adjacent to each other and the end sections.

Free material flow means that the lateral surface of the transition section does not come in contact with a shaping tool and the shaping of the transition section to form the intermediate section takes place through the shaping forces acting on the blank planets on both axial sides of the transition section. The material of the blank planet is displaced only in the way of forming the first and the second edge teeth such that the intermediate section is formed. The transition section is dimensioned and arranged accordingly, wherein it is ensured that the intermediate section—with the exception of the tooth flank of the first edge tooth facing the end section—does not come into contact with the threaded spindle and the spindle nut of the planetary rolling contact gear.

The shaping forces contacting the planet blank have the effect that the transition section of the planet blank is shaped into the intermediate section of the planet, wherein the intermediate section extends in the radial direction between the tooth tips of the first and the second edge teeth.

The transition section of the planet blank can have a tapered lateral surface whose peripheral edge sections connect integrally to the cylindrical end sections and to the cylindrical middle section. This tapered lateral surface is arranged so that its shaping in the free material flow generates the desired contour of the intermediate section.

The planet blank can be produced through impact extrusion in an economically favorable way with its cylindrical middle section, its cylindrical end sections, and its tapered transition sections arranged between the middle section and the end sections.

The impact-extruded planet blank can be ground in a subsequent grinding process, wherein a desired shape accuracy is achieved with tight tolerances. Centerless grinding is one option here.

During the shaping of the planet blank, in the described way, the two engagement profiles can be shaped and also the pegs connecting integrally to the free ends of the end sections can be formed. The peg diameter can be designed according to the application and can be less than the diameter of the base of the second groove.

The planet according to the invention produced in this way can be hardened in a heat treatment process.

For the shaping, in particular, the rolling method is suitable with which rotationally symmetric bodies can be produced in an economically favorable way. The rolling with flat rolling tools and other rolling tools is suitable for the production of planets according to the invention. During the rolling process, rolling forces that shape the planet blank in the desired way act as a shaping force on the planet blank. Under a relative rotation of the rolling cylinders or a relative displacement of the flat rolling tools provided with rolling profiles, the planet blank clamped between the tool parts rotates and/or glides about its longitudinal axis, wherein the planet blank rolls and/or slides on the rolling profiles of the tool and wherein, under the effect of the shaping forces, the desired contour is rolled into the planet blank.

For performing the method according to the invention, in particular, a flat forming tool is suitable, having two flat dies that are each provided on facing sides with a rolling profile for rolling the two engagement profiles and the peg, wherein the two flat dies are displaced relative to each other along an axis. The rolling profile can have a middle rolling profile for rolling the first engagement profile, and also an outer rolling profile for rolling the second engagement profile and the peg.

In the transition between the middle rolling profile and the outer rolling profile, a rolling free transition area can be formed without contact with the planet blank. In this rolling free transition area, the transition section of the planet blank is shaped using free material flow, that is, without which, the lateral surface of the transition section is in direct contact with the rolling tool. During the rolling process, the first edge tooth is not completely formed and is subjected to free material flow in its crown area and its tooth flank area facing the end section.

The described blank planet allows, in an economically favorable way, the rolling of the first and second engagement profile and also the peg in a common rolling process.

Planets according to the invention are especially suitable for large-scale production due to their economical production, for example, for the use of planetary rolling contact gears in automotive engineering.

BRIEF DESCRIPTION OF THE DRAWINGS

Below, the invention is described in more detail with reference to an embodiment shown in a total of seven figures. Shown are.

DETAILED DESCRIPTION OF THE PREFERRED EMBODIMENT

Figure 7:
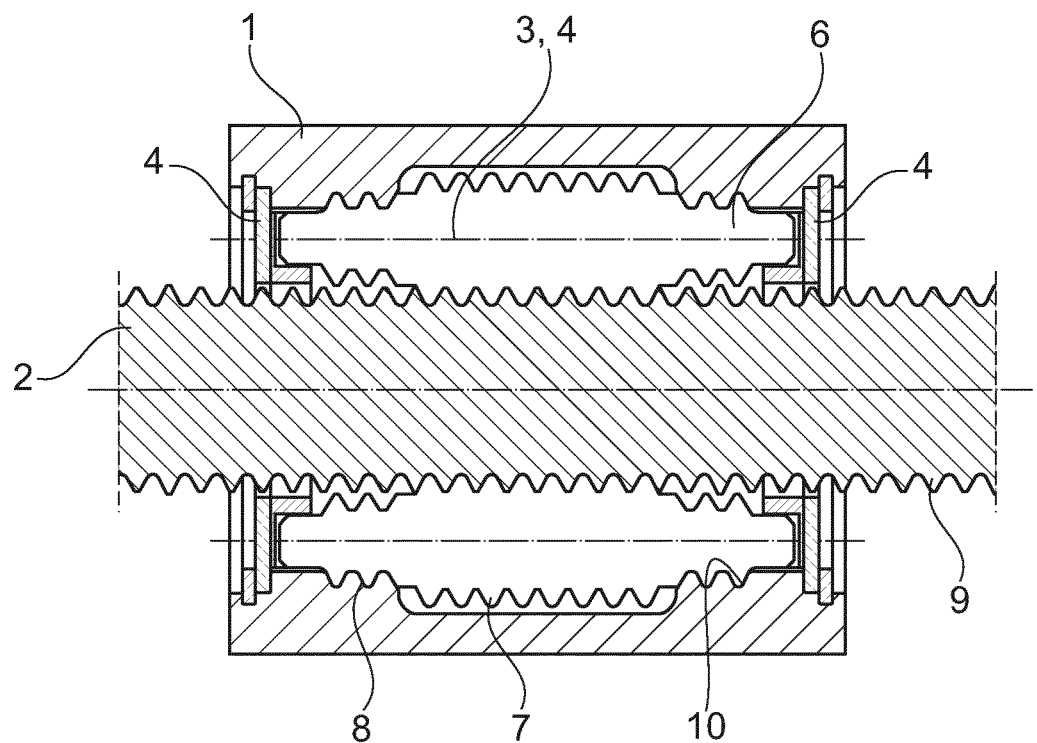

FIG. 7 shows a conventional planetary rolling contact gear in which planets according to the invention can be used.

A spindle nut 1 is arranged on a threaded spindle 2. Between the spindle nut 1 and the threaded spindle 2, planets 3 distributed over the periphery are arranged. On both axial sides of the planets 3 there are spacer washers 4 that keep the planets 3 at a distance to each other in the peripheral directions. During operation, the planets 3 roll on the spindle nut 1 and on the threaded spindle 2 and rotate about their planet axis. The spacer washers 4 rotate together with the planets 3 relative to the spindle nut 1 and the threaded spindle 2.

Each planet 3 has a middle section 5 with a larger diameter along its planet axis and end sections 6 with smaller diameters on the two sides of middle section 5 in the axial direction, wherein a first engagement profile 7 is formed on the lateral surface of the planet 3 in the middle section 5 and second engagement profiles 8 are formed in each of the end sections 6. With their first engagement profile 7, the planets 3 are in rolling engagement with a thread 9 of the threaded spindle 2 wound in a helical shape about the spindle axis. With their second engagement profile 8, the planets 3 are in rolling engagement with a nut-side engagement profile 10 of the spindle nut 1.

Figure 1:
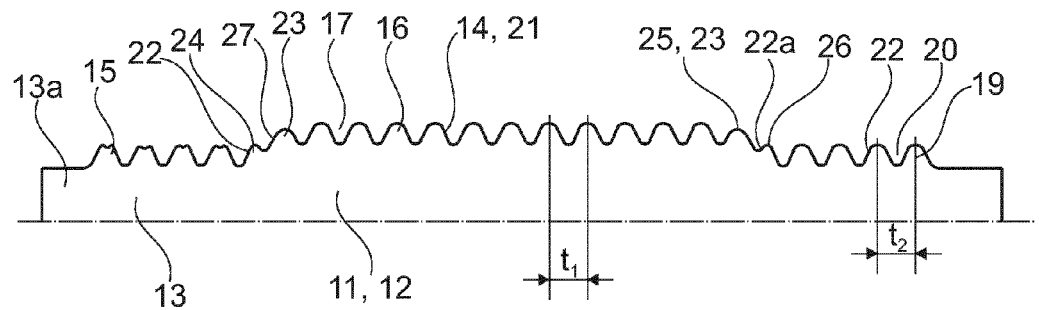
FIG. 1 a planet according to the invention,
FIG. 2 an enlarged portion from FIG. 1,
FIG. 3 a rolling engagement between a spindle nut and the planet according to the invention in cross-section,
FIG. 4A a flat forming tool according to the invention with a planet blank before a rolling process,
FIG. 4B the flat forming tool according to the invention from FIG. 4A with a rolled planet,
FIG. 5 an enlarged portion from FIG. 4B,
FIG. 6 a planet blank according to the invention and a model planet provided for the design, each in half section, and
FIG. 7 a known planetary rolling contact gear.
Figure 2:
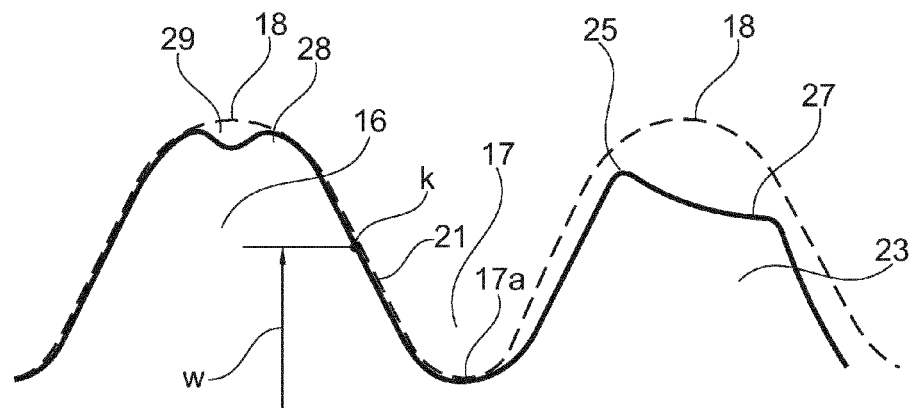
Figure 3:
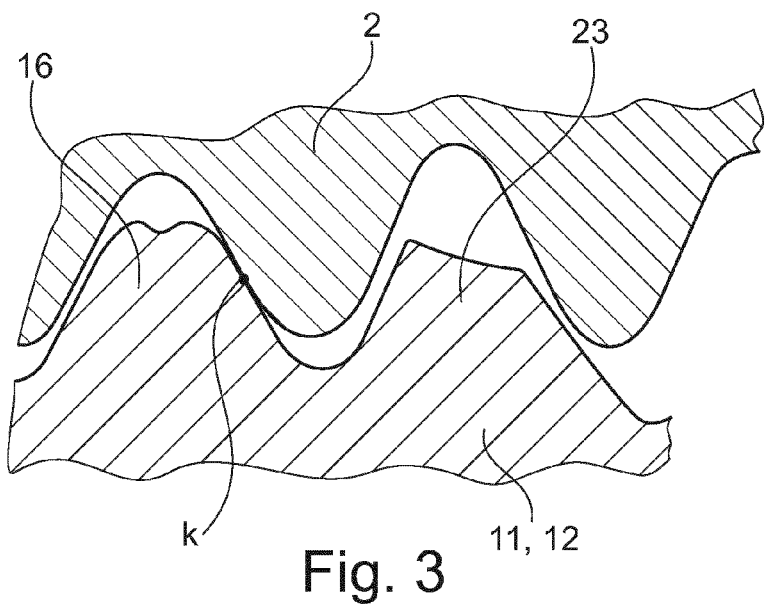

FIGS. 1, 2, and 3 show a planet 11 according to the invention in longitudinal half section, in an enlarged portion, and in an enlarged portion in rolling contact with the threaded spindle 2. Each planet 11 has a middle section 12 with a larger diameter along its planet axis and end sections 13 with smaller diameters on both sides of the middle section 12 in the axial direction, wherein a first engagement profile 14 is formed on the lateral surface of the planet 11 in the middle section 12 and second engagement profiles 15 are formed in each of the end sections 13. The first engagement profile 14 is provided for a rolling engagement with a thread of a threaded spindle wound in a helical shape about the spindle axis. The second engagement profile 15 is provided for a rolling engagement with a nut-side engagement profile of a spindle nut.

The first engagement profile 14 of the planet 11 has a plurality of first teeth 16 arranged in the shape of a ring about the planet axis, wherein first grooves 17 arranged in the shape of a ring about the planet axis are formed between successive first teeth 16, wherein a tooth contour 18 is allocated to the first teeth 16 of the middle section 12. These first grooves 17 are also designated as advance feed grooves, because the rolling engagement with the threaded spindle allows the relative advance feed between threaded spindle and spindle nut.

The second engagement profile 15 has a plurality of second teeth 19 arranged in the shape of a ring about the planet axis, wherein second grooves 20 arranged in the shape of a ring about the planet axis are formed between successive second teeth 19. These second grooves 20 are also designated as guide grooves, because the planets 11 are provided with these second grooves 20 for rolling engagement with the nut-side engagement profile and are guided on a circular path about the spindle axis into the spindle nut.

With their facing tooth flanks 21, adjacent first teeth 16 bound the first groove 17. With their tooth flanks 22 facing away from each other, adjacent second teeth 19 bound the second groove 20.

The grooves and teeth arranged in the shape of a ring about the planet axis as described here are arranged transverse to the planet axis.

A cylindrical peg 13a arranged coaxial to the planet axis is provided on both axial ends of the planets 11 for engagement in bearing openings of a spacer washer, as was described above for FIG. 7.

The two first edge teeth 23 located on the ends of the middle section 12 are constructed only incompletely in the way according to the invention relative to the other first teeth 16 arranged in-between.

On their ends facing the middle section 12, the two end sections 13 each have a second edge tooth 24 that is formed incompletely relative to the adjacent second teeth 19. The tooth flank 22 of the second edge tooth 24 facing the second tooth 19 is constructed in a similar or identical way to the tooth flanks 22 of the adjacent second teeth 19. The other tooth flank 22a of the second edge tooth 24 allocated to an intermediate section 27, however, is constructed only incompletely and is not provided for rolling engagement.

The intermediate section 27 is constructed between tooth tips 25, 26 of the first edge tooth 23 and the second edge tooth 24. Due to its formation in free material flow, the tooth tip 25 of the first edge tooth 23 is shaped only weakly. The second teeth 19 are smaller in diameter than the first teeth 16 relative to the planet axis. The intermediate section 27 tapers along the planet axis in the direction toward the end section 13. The intermediate section 27 is dimensioned such that contact of the threaded spindle is possible only with the tooth flank of the first edge tooth 23 facing the end section 13, but contact in the rest of the intermediate section 27 is precluded. The intermediate section 27 is not provided for rolling engagement with the spindle nut.

The first teeth 16 have a parallel spacing with an identical pitch t1. The second teeth 19 have a parallel spacing with an identical pitch t2.

FIG. 2 clearly shows the first edge tooth 23 and adjacent to this, one of the first teeth 16, whose tooth tip 28 has a so-called closing fold 29 that is formed peripherally about the planet axis. The closing fold 29 is the result of a production method of the planet according to the invention described below. The tooth contour 18 allocated to the first tooth 16 is shown clearly, wherein the first edge tooth 23 is formed in a way according to the invention within and at a distance to the tooth contour 18. The first edge tooth 23 is formed in this embodiment from its tooth tip to the base of the groove 17 within and at a distance to the tooth contour 18.

The tooth tip 25 of the first edge tooth 23 is arranged radially within the tooth tip 28 of the adjacent first tooth 16. The tooth height of the first edge tooth 23 is approximately 50-90 percent of the tooth height of the adjacent first tooth 16. On the tooth flank of the first edge tooth 23 facing the first tooth 16, the tooth height is 70 to 90 percent of the tooth height of the first tooth 16. On the tooth flank of the first edge tooth 23 facing the second edge tooth 24, the tooth height is up to 50 to 70 percent of the tooth height of the first tooth 16. The tooth height extends from the groove base 20a of the first groove 20.

For common planet sizes up to approximately 10 mm in diameter, the first edge tooth of the middle section is, starting from a tooth center, approximately 2 times 0.005 to 2 times 0.02 mm narrower than the adjacent first teeth.

The surface of the first edge tooth 23 is formed in the area of the intermediate section 27 in free material flow; this means that this surface is formed due to the plastic shaping of material of the planet, without the intermediate section coming into contact with a shaping tool.

With a radius w about the planet axis, a rolling contact path for the rolling contact with a spindle nut is formed on the planet 11 in the middle section 12. At the height of the rolling contact path, a significant axial distance of the first edge tooth 23 to the tooth contour 18 is formed. Rolling contact with the threaded spindle can be possible under elastic deformation of the components transferring the load. However, the forces occurring in this rolling contact are significantly reduced. The edge teeth are thus not a starting point for damage.

FIG. 3 shows an enlarged cross-section of the planet 11 in the middle section 12 in rolling engagement with the threaded spindle 2. In rolling contact K on the rolling contact path, the threaded spindle 2 and the planet 11 contact each other. It can be clearly seen that there is no rolling contact between the first edge tooth 23 and the threaded spindle 2. Such rolling contact can occur due to elastic deformation only with further axial loading of the planetary rolling contact gear; but the force occurring in this rolling contact is so low that material will not break away from the first edge tooth 23. This advantage is given by the underformed first edge tooth 23 according to the invention.

FIG. 3 further shows the engagement of the threaded spindle 2 in the grooves 17 of the middle section 12 of the planet 11 according to the invention. The thread of the threaded spindle 2 does not reach to the base of the groove 17. Within the overlap of the thread of the threaded spindle 2 and the first teeth 16, the first teeth 16 have a useful section. In this embodiment, the first edge teeth 23 are arranged in the useful section of the first teeth 16 within and at a distance to the tooth contour 18 (FIG. 2) and also up to the tooth root, that is, up to the base of the groove 17 within the tooth contour 18.

Figure 4A:
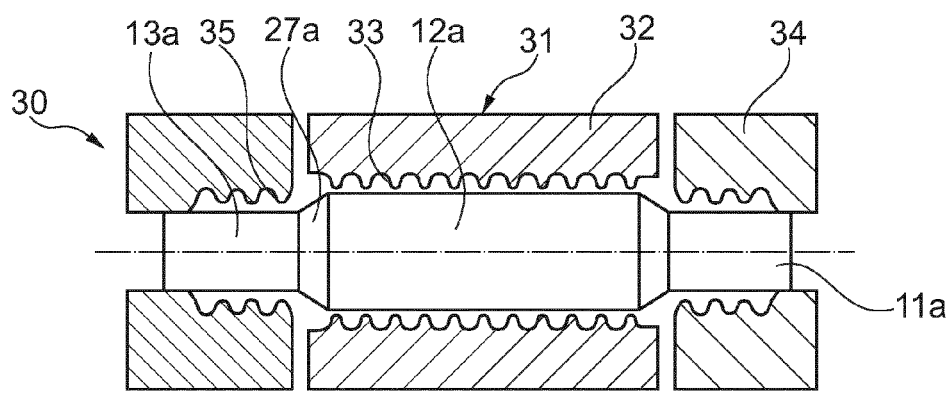
Figure 4B:
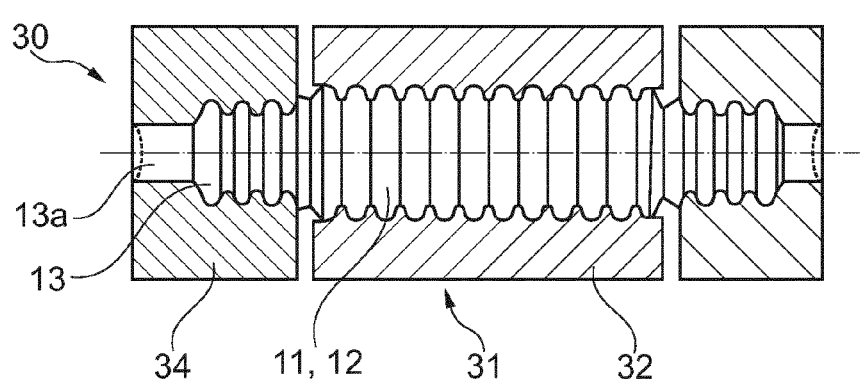

FIGS. 4A and 4B show a flat forming tool for producing plants according to the invention, wherein the method for producing the planets and the flat forming tool for performing the method are described below.

The flat forming tool 30 has two flat dies 31 that are arranged opposite each other and are each constructed in three parts in this embodiment. The flat dies 31 are each provided on their facing sides with a rolling profile. The middle flat die part 32 is provided with a middle rolling profile 33 for rolling the first engagement profile into the planets. The two outer flat die parts 34 are each provided with an outer rolling profile 35 for rolling the second engagement profile and the peg into the planets.

The flat dies 30 extend along a tool axis out of the plane of the picture, wherein the two flat dies 30 are displaced relative to each other along this tool axis during the rolling process.

Between the two flat dies 30 there is a planet blank 11a that is rolled in the rolling process to form the planet 11 according to the invention (FIG. 4b).

The planet blank 11a is produced in an economically favorable way in an impact extrusion method. Impact extrusion is promoted by the simple shape of the planet blank 11a that has a cylindrical middle section 12a and two non-stepped cylindrical end sections 13a adjacent in the axial direction. These non-stepped end sections 13a form the ends sections according to the rolling process and the stepped peg of the planets according to the invention. Tapered transition sections 27a are formed between the end sections 13a and the middle section 12a. The axial edges of these transition sections connect integrally to the cylindrical ends of the middle section 12a and the end sections 13a. In the embodiment, the lateral surface of the tapered transition section 27a encloses with the planet axis an angle of approximately 45 degrees. After the impact extrusion, the planet blanks 11a are ground in a centerless way and obtain dimensional accuracy that is suitable for the subsequent rolling process.

For rolling, the two flat dies 32 are moved one on top of the other, wherein the rolling profile of the flat dies 32 is pressed into the lateral surface of the planet blank and plastically shapes the planet blank. With the forming tool movement, the planet blanks 11a roll and slide on the flat dies 32, wherein, after several revolutions of the planet blank 11a, the end of the forming tool is reached and the planet 11 has obtained its final contours.

From FIG. 4A it can be seen that the transition section 27a of the blank planet lies in a rolling free transition area of the flat forming tool 30 in which, during the rolling process, there is no contact of the transition section 27a with the flat forming tool.

FIG. 4B shows the completely rolled planet 11 as was described above in detail. A lens-shaped, underformed end side of the planet 11 can also be seen clearly and is shown with dash-dot lines. This lens-shaped underforming is a result of the rolling process in the flat forming tool 30 when the planet blank has a flat end surface. The lens-shaped underforming of the end side can be suppressed, however, with a correspondingly prepared end surface of the planet blank.

During the rolling, material of the blank planet 11a is shaped and flows into the rolling profile of the forming tool. The contour of the rolling profile forces the material flow into the provided contour of the planet, wherein, due to the construction of the blank planet 11a according to the invention, the first edge tooth 23 is shaped only on its tooth flank facing the other first teeth 16 by the rolling profile of the flat forming tool. Otherwise, the edge tooth 23 forms during the free material flow and is formed so small that, during operation of a planetary rolling contact gear, the first edge tooth 23 is loaded not at all or only with reduced loads. The shaping forces active for generating the first and the second edge teeth 23, 24 force material of the blank planet 11a in the area of the transition section 27a.

Figure 5:
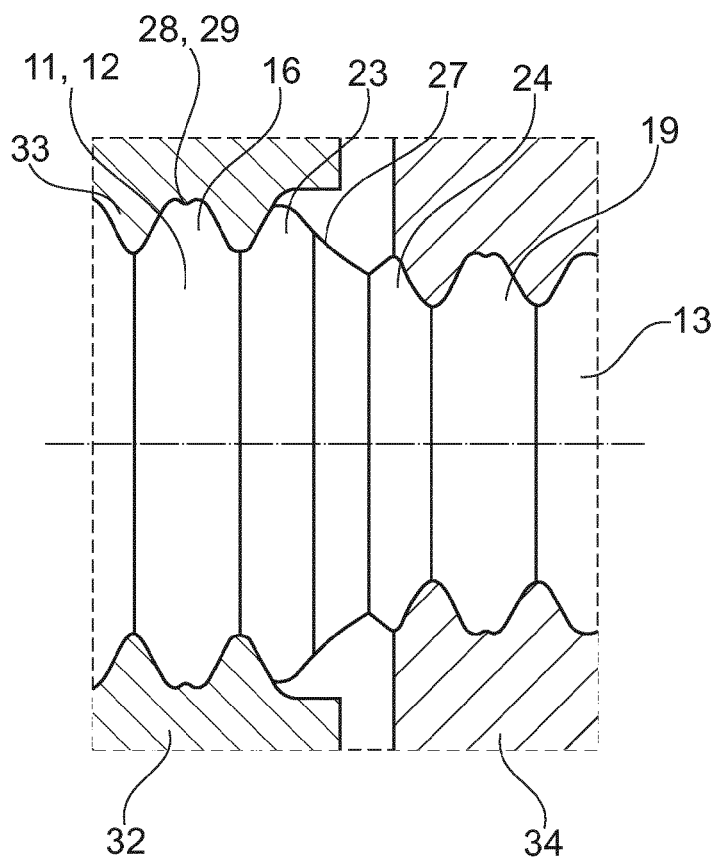

FIG. 5 shows an enlarged portion from FIG. 4b. Here it can be clearly seen that the transition section of the planet blank was shaped to form the intermediate section 27 of the planet 11, without contact to the rolling tool. This shaping is consequently realized with free material flow. It can be clearly seen that the tapered intermediate section 27 tapers in the direction toward the end section 13. The flat forming tool 30 is not filled completely in the area of the intermediate section 27; room is created for the free material flow.

FIG. 5 shows the closing fold 29 on the tooth tip 28 on the illustrated first tooth 16. Through the rolling engagement of the middle rolling profile 33, material of the blank planet 11a is forced outward in the radial direction between adjacent teeth of the rolling profile while forming the first tooth 16. The material flows in the direction of the tooth tip 28 coming from both tooth flanks of the rolling profile and moves into the tooth tip while forming the closing fold 29.

Figure 6:
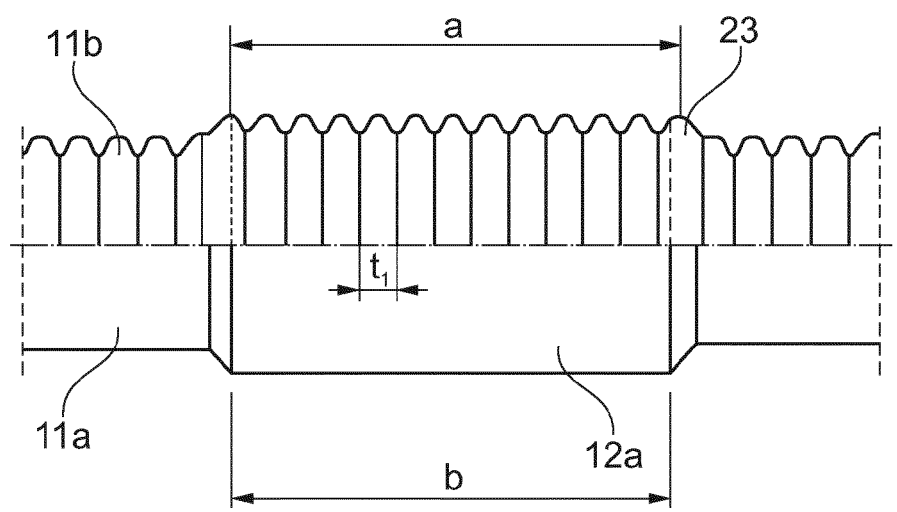

FIG. 6 shows in half section a model planet 11b (top) and the planet blank 11a (bottom) without the formed peg. The model planet 11b differs from the planet according to the invention only in that the edge teeth of the middle section are filled completely, that is, they are not underformed. With this model planet, the center distance from a first edge tooth to the other first edge tooth can be indicated precisely. This center distance a has an approximate relationship specified below relative to the axial extent of the cylindrical middle section 12a of the blank planet 11a.

The center distance a is equal to or corresponds approximately to the sum from the axial extent b of the cylindrical middle section 12a of the planet blank 11a to the beginning of the 45 degree bevel plus ½*t1 (half the pitch t1). With this arrangement, a planet 11 according to the invention can be provided with a shortened middle section and an underformed edge tooth according to the invention.

Planets according to the invention can be consequently produced with the described flat forming tool in the described way economically, wherein the blank planet is shaped to form the planet in a single rolling process. The planet can then be hardened in heat-treatment processes.

LIST OF REFERENCE NUMBERS

1 Spindle nut
1 Threaded spindle
2 Planet
3 Spacer washer
4 Middle section
5 End section
6 First engagement profile
7 Second engagement profile
8 Thread
9 Nut-side engagement profile
10 Planet
11a Planet blank
11b Model planet
11 Middle section
12a Cylindrical middle section
12 End section
13a End section
13 First engagement profile
14 Second engagement profile
15 First tooth
16 First groove
17 Tooth contour
18 Second tooth
19 Second groove
20a Groove base
20 Tooth flank
21 Tooth flank
22 First edge tooth
23 Second edge tooth
24 Tooth tip
25 Tooth tip
26 Intermediate section
27a Tapered transition section
27 Tooth tip
28 Closing fold
29 Flat forming tool
30 Flat die
31 Middle flat die part
32 Middle rolling profile
33 Outer flat die part
34 Outer rolling profile

The invention claimed is:

1. A planet for a planetary rolling contact gear, comprising:
 a middle section with a greater diameter and end sections with smaller diameters on two sides of the middle section in an axial direction of a planet axis,
 a first engagement profile formed on a lateral surface of the planet in the middle section and a second engagement profile formed in each of the end sections,
 wherein the first engagement profile includes:
  a plurality of first teeth arranged in a shape of a ring about the planet axis and including at least a first tooth and two first edge teeth, and
  a plurality of first grooves arranged in the shape of a ring about the planet axis, formed at a first radial position between successive first teeth, and
  said two first edge teeth being located at ends of the middle section and including a first edge tooth, and said plurality of first grooves including a first groove positioned at the first radial position and axially between the first tooth and the first edge tooth, wherein the first groove transitions into the first tooth such that a peak of the first tooth is radially outward of the first groove and defines a first height relative to the first radial position, wherein the first groove also transitions into the first edge tooth such that a peak of the first edge tooth is radially outward of the first groove and defines a second height relative to the first radial position, and wherein the first height is greater than the second height.

2. The planet according to claim 1, wherein tooth flanks of the first teeth have first rolling contact paths arranged coaxially about the planet axis for the engagement of a threaded spindle, and the two first edge teeth have a smaller tooth thickness relative to the first teeth of the middle section on a radius (w) of a rolling contact path about the planet axis.

3. The planet according to claim 1, wherein tooth tips of the first edge teeth are arranged radially within the tooth tips of the first teeth of the middle section.

4. The planet according to claim 3, wherein the second height is approximately 50% to approximately 90% of the first height.

5. The planet according to claim 1, wherein the second engagement profile of each end section includes:
   a plurality of second teeth arranged in a ring shape about the planet axis and including a second tooth,
   a plurality of second grooves arranged in a ring shape about the planet axis, formed at a second radial position between successive ones of the second teeth, and including a second groove, and
   a second edge tooth formed between the first edge tooth and the plurality of second teeth,
   wherein the second radial position is closer to the planet axis than the first radial position.

6. The planet according to claim 5, further including an intermediate section that extends in the axial direction between the peak of the first edge tooth and a peak of the second edge tooth between the middle section and the two end sections.

7. The planet according to claim 6, wherein the intermediate section defines a third groove formed at a third radial position, the third radial position being radially between the first radial position and the second radial position.

8. The planet according to claim 7, wherein the third groove transitions into the first edge tooth on one side and transitions into the second edge tooth on another side.

9. The planet according to claim 7, wherein:
   the second groove transitions into the second tooth such that a peak of the second tooth forms a third height relative to the second radial position,
   the second groove transitions into the second edge tooth such that the peak of the second edge tooth forms a fourth height relative to the second radial position, and the third height is equal to the fourth height.

10. A method for producing a planet according to claim 1, according to the following steps:
    preparing a planet blank that has a thicker middle section along the planet axis and thinner end sections located at both axial ends of the middle section, forming a transition section tapering from the middle section in a direction toward the end section between the middle section and the end section, rolling the first and second engagement profiles in a lateral surface of the middle section and the end sections, wherein a lateral surface of the transition section of the planet blank is shaped with a shaping force in free material flow to form an intermediate section of the planet located between tooth tips of two first edge teeth and respective second adjacent edge teeth of the end sections adjacent to the first edge teeth.

11. The method according to claim 10, wherein the intermediate section extends in a radial direction between tooth tips of the first and the second edge teeth.

12. The method according to claim 10, wherein the planet blank is produced by impact extrusion with the cylindrical middle section, the cylindrical end sections, and the transition sections arranged between the middle section and the end sections.

13. The method according to claim 12, further comprising grinding the impact-extruded planet blank in a subsequent grinding process.

14. The method according to claim 12, wherein the two engagement profiles and adjacent, integral pegs on free ends of the end sections are rolled on the planet blank.

15. The method according to claim 14, further comprising hardening the planet after the rolling of the engagement profiles and the peg in a heat-treatment process.

16. A device for performing the method according to claim 14, comprising a flat forming tool, two flat dies that are provided on facing sides thereof with a rolling profile for rolling the two engagement profiles and the pegs, wherein the two flat dies are displaceable relative to each other.

17. The device according to claim 16, wherein the rolling profile has a middle rolling profile for rolling the first engagement profile and an outer rolling profile for rolling the second engagement profiles and the pegs.

18. The device according to claim 17, wherein a rolling free transition area adapted to not contact the planet blank is formed between the middle rolling profile and the outer rolling profile.

* * * * *